May 3, 1932.  F. JACOBS  1,856,997
TRAILER CONTROL
Filed March 5, 1931  2 Sheets-Sheet 1
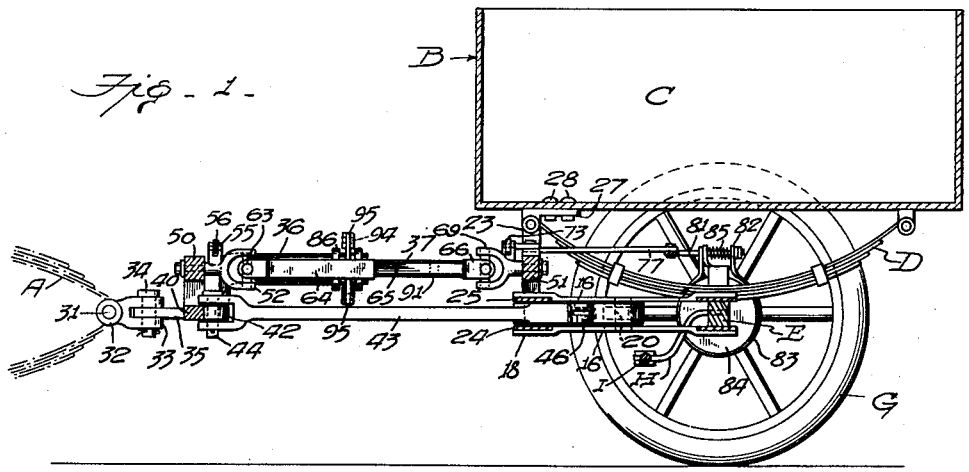
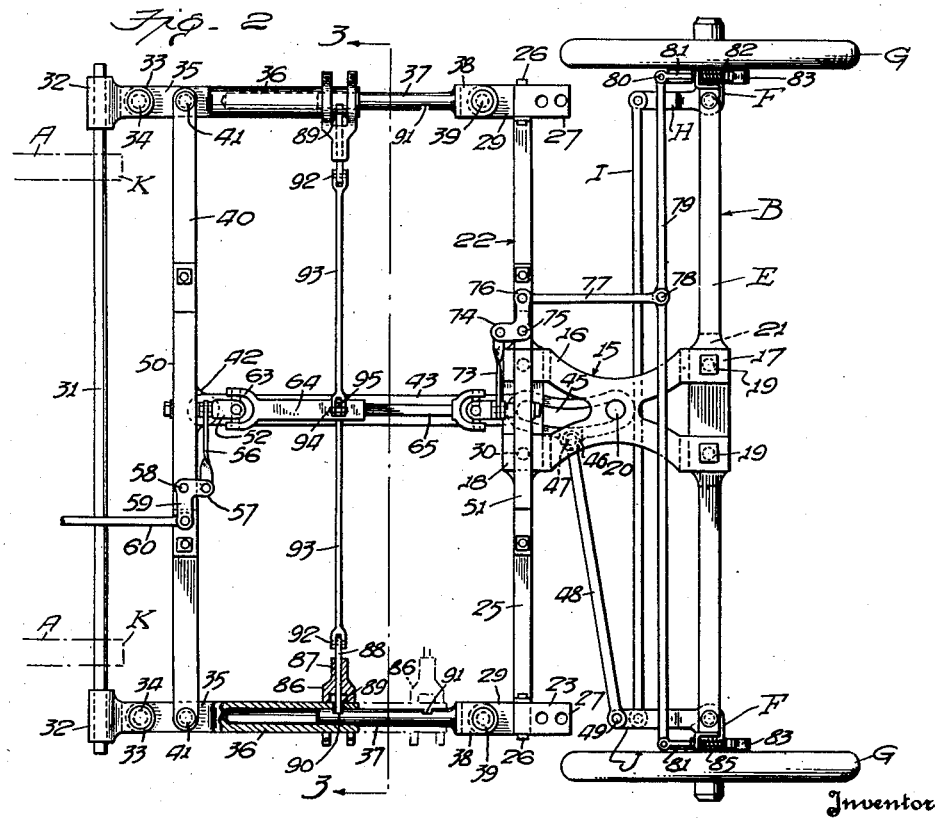
Inventor
Frank Jacobs
By John Milton Jester
Attorney

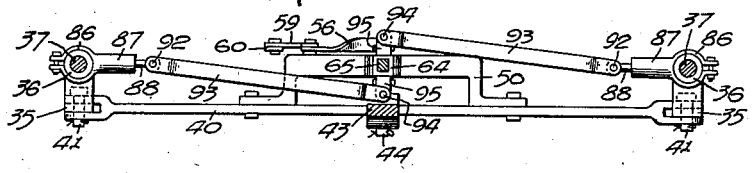
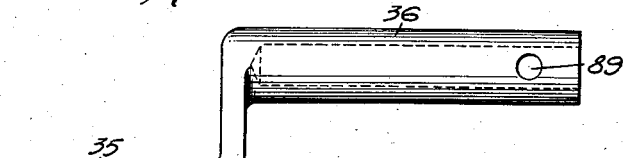
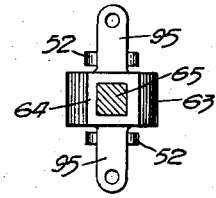
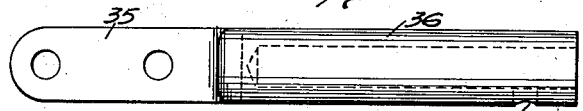
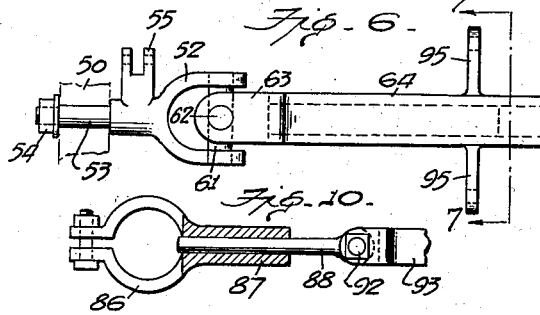
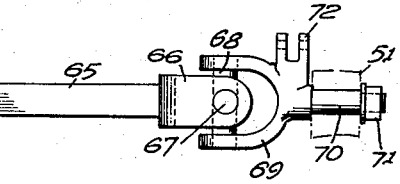
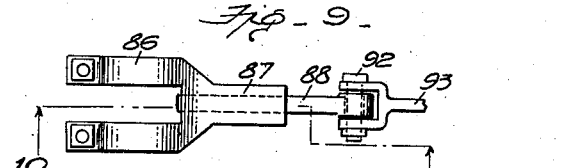
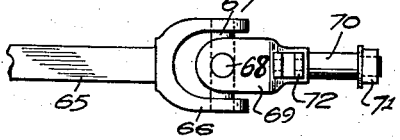
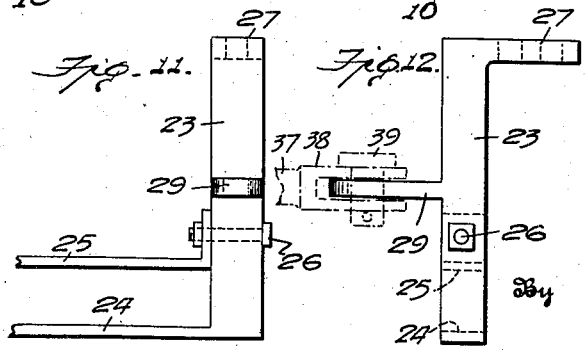

Patented May 3, 1932

1,856,997

UNITED STATES PATENT OFFICE

FRANK JACOBS, OF PRAIRIE, IDAHO

TRAILER CONTROL

Application filed March 5, 1931. Serial No. 520,380.

The invention relates to draft devices for vehicles, particularly to means for towing trailers, and has for its general object the provision of a novel draft device by means of which the trailer may be caused to track properly with respect to a main vehicle.

It is well known that it has become a common practice among tourists, campers and also in some instances in commercial fields to make use of a trailer which is usually mounted upon two wheels and which follows along behind an automobile, truck or the like. Of course the problem arises as to how the trailer wheels may be made to follow the wheels of the towing or leading vehicle in order that there will be no difficulty experienced in making turns, especially in close quarters.

It is with the above facts in view that I have devised the present invention which has for an object the provision of a novel device adapted to be secured upon the rear of an automobile or other leading or towing vehicle and which is connected with the axle and steering arm of the trailer for the purpose of controlling the movements of the latter and insuring accurate tracking.

A very important object of the present invention is to provide a trailer control or draft means in which provision is made for preventing the trailer from running up on the towing vehicle and thereby disorganizing the tracking, this means being provided and operable for both forward and rearward travel.

A more specific object of the invention is to provide a draft mechanism having means under the control of the operator for locking certain relatively movable parts so that they will be maintained in the proper position for forward movement of the trailer or for backing thereof, this means also having a certain relation to brake mechanism on the trailer.

An additional object is to provide a mechanism of this character which will be simple and inexpensive to make, assemble and install, positive in action, efficient and durable in service, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a vertical longitudinal section through a mechanism constructed in accordance with my invention, Figure 2 is a top plan view thereof, Figure 3 is a vertical cross section taken on the line 3—3 of Figure 2, Figure 4 is a detail side elevation of one of the guide members connected with the towing vehicle, Figure 5 is a plan view thereof, Figure 6 is a side elevation of the central member of the latch actuating mechanism, Figure 7 is a detail cross section taken on the line 7—7 of Figure 6, Figure 8 is a fragmentary detail view showing a plan of one end of what is shown in Figure 6, Figure 9 is a detail plan view of one of the latch guide devices, Figure 10 is a section on the line 10—10 of Figure 9, Figure 11 is a detail front elevation of one of the bracket members supporting the body of the trailer, and Figure 12 is a side elevation thereof.

Referring more particularly to the drawings, the letter A designates a portion of the rear springs of a towing or leading vehicle, and B designates the trailer as a whole. This trailer is represented as comprising a suitable body C mounted by means of springs D upon an axle E equipped at its ends with spindles F upon which are mounted ground engaging wheels G. The spindles are pivotally mounted as is customary and both are provided with arms H connected by a steering arm connecting rod I. One spindle is additionally provided with a steering arm J.

In carrying out the invention I provide a yoke member 15 which may conveniently be formed as a casting and which is represented as of substantially X-shape and including upper and lower members 16 preferably offset at the ends, as shown at 17 and 18, the ends 17 engaging at the top and bottom of the axle E and secured thereto in any desired manner as by bolts 19. Located at the center of this X-shaped member is a trunnion element 20. It is preferable that the central portion of the axle E be widened to provide a better means for securing the X member in place so that it will be more secure. The axle is shown as longitudinally slotted at 21 from beyond the points of attachment of the rear ends of the X member thereto, for a reason to be hereinafter explained.

The structure further includes a frame member indicated as a whole by the numeral 22 and including brackets 23 which extend vertically and which are connected by a horizontal bar 24 above which is located in spaced relation thereto a somewhat similar bar 25 secured at its ends, as by bolts 26, to the brackets 23. These brackets 23 have their upper ends formed with attaching portions 27 bolted at 28 to the bottom of the trailer body. These bracket members are also formed with forwardly projecting apertured ears 29 for a purpose to be described. The central portions of the bars 24 and 25 lie between the offset forward ends 18 of the arms of the X-shaped member 15 and are secured thereto as by bolts 30. The central portions of the bars 24 and 25 are preferably widened as clearly shown in Figure 2 so as to provide ample surfaces for connection with the X-shaped member.

The apparatus further includes a rod or bar 31 which may be attached to the towing or leading vehicle in any desired manner whatsoever and which is here represented as passing through the eyes K at the ends of the springs A. Mounted on the projecting ends of this rod 31 are sleeves 32 carrying spaced ears 33 between which are pivoted, at 34, the forward ends of arms 35 which have their rear portions 36 of tubular formation and slidably receiving rod-like extensions 37 on clevises 38 which straddle and which are pivoted at 39 to the above mentioned apertured ears 29. Near the pivots 34, the arms 35 are connected by a bridle bar 40 which preferably has bifurcated ends and which is pivoted to the arms at 41. Intermediate its ends this bridle bar is formed with an apertured ear 42.

The device further includes a draft tongue 43 with a bifurcated end pivoted at 44 upon the ear 42. The rear portion of this draft tongue is preferably of curved shape and formed with an arcuate slot 45, this rear end being accommodated between the central portions of the bars 24 and 25, between the upper and lower members 16 of the X-shaped yoke, and adapted under certain circumstances to be received within the slot 21 in the trailer axle E. The slot 45 engages upon the trunnion pin 20 as clearly indicated in Figure 2. At one side the curved or slotted end of the draft tongue is provided with ears 46 between which is pivoted at 47 a rod 48 pivotally connected at 49 with the steering arm J.

Up to this point there is no provision for preventing the trailer from running up on the towing vehicle, for instance as when descending a hill or making a stop. It is of course important to maintain proper tracking of the trailer at all times and this can be insured only by preventing such running up. In order to accomplish this I provide a peculiar mechanism which is shown as comprising, broadly, latch means which will maintain the trailer and towing vehicle in the proper relation at all times, this latch means being controllable by the operator of the leading vehicle.

Actually this structure is shown as comprising arched brackets 50 and 51 secured upon the bar 40 and bar 24 respectively. A species of telescopic universal joint device is mounted between and carried by these brackets and operates the latch device to be described. This universal joint device comprises a fork member 52 formed with a trunnion 53 journaled through the bracket 50, disconnection being prevented as by a nut 54. This fork is provided with spaced ears 55 between which is pivoted a link 56 in turn pivoted to one arm 57 of an angle lever pivoted at 58 on the bracket 50, the angle lever having its other arm 59 connected with a rod 60 which extends forwardly and which may be connected with the emergency brake lever or with a separate lever or pedal, none of which is shown, on the towing vehicle, the entire idea being that the operator may readily apply a pull upon the rod 60 if he so desires. Within the fork 52 is a spider having opposite trunnions 61 pivoted between the arms of the fork and having other trunnions 62 pivoted within a fork 63 on the forward end of a sleeve 64 which is rectangular in cross section and within which is slidably engaged a bar 65 carrying a fork 66 within which is a spider including trunnions 67 pivoted within the arms of the fork 66 and including other trunnions 68 pivoted between the arms 69 of another fork which has a trunnion 70 rotatably engaged through the bracket 51, longitudinal displacement being prevented by a nut 71. The fork 69 is formed with spaced ears 72 between which is pivoted one end of a link 73 which has its other end pivoted to one arm 74 of an angle lever pivoted at 75 on the bracket 51. The angle lever includes another arm 76 to which is pivoted a rod 77 which is in turn connected at 78 with a bridle bar 79 which in turn has its ends connected at 80 with pull rods 81 passing through ears 82 on brake bands 83 which surround drums 84 carried by the trailer wheels G, springs 85 being provided between the ears for the purpose of normally holding the brake bands expanded and out of contact with the drums.

The latch means includes clamps 86 secured upon the sleeves 36 and formed with guide portions 87 for slidable latch bolts 88 which extend through openings 89 in the sleeves 36 and which are adapted to enter notches 90 and 91 in the members 37. The inner ends of the latch bolts are pivoted at 92 to the outer ends of rods 93 which have their inner ends pivotally connected at 94 with oppositely extending arms 95 on the sleeve member 64.

In the operation, it should be understood that when the towing vehicle is travelling forwardly, the latch bolts 88 should be in engagement within the notches 90 so that the parts will be in the position shown in Figures 1 and 2. At such time the tongue 43 will be in forwardmost position with the rear end of the slot 45 engaging upon the trunnion pin 20. When the leading or towing vehicle makes a turn in either direction, the tongue 43 will pivot and swing in one direction or the other upon the pin 20 as a fulcrum. Naturally, this will result in corresponding movement of the arm 48 and as this is pivoted to the steering arm J, the spindles carrying the wheels G will be swung, the movement of both being simultaneous on account of the provision of the connecting rod I. As the wheels of the trailer are thus moved they will track after the wheels of the towing vehicle. The telescopic members 36 and 37, the former of which are connected by the bridle bar 40, will operate to maintain the parts always in their proper relation so that no undesirable lateral swinging or twisting of the trailer will occur. However, there is sufficient freedom of movement in the various joints to avoid racking of the parts in case the vehicles are travelling over uneven ground. Clearly, the trailer cannot overrun or run up on the towing vehicle as the latch bolts 88 engaged within the notches 90 will preclude any movement of the members 37 within the sleeves 36. Consequently the wheels of the trailer will track properly after those of the towing vehicle.

If at such a time it is so desired, the operator may operate whatever brake or pedal is connected with the rod 60 and move the latter forwardly whereupon the telescopic universal joint device comprised by the parts 52, 64, 65 and 69 will rotate as a unit, swinging the angle lever arms 74 and 76 and moving the bridle bar 79 for applying a pull upon the pull rods 81, thereby contracting the brake bands 83 about the drums 84. Of course this rocking of the telescopic universal joint device retracts the bolts 88 from the notches 90 but this will have no undesirable effect as they will reengage therein when the operator relieves the forward pressure upon the rod 60, the springs 85 then functioning to restore the parts to normal or initial position.

When it is desired to back, it is first necessary for the operator to move the rod 60 forwardly by whatever means may be provided so as to rock the telescopic members 64 and 65 and their universal joint mountings so that the resulting movement of the arms 95 will pull the rods 93 inwardly and retract the latch bolts 88 from the notches 90. This of course applies the brakes to the trailer wheels. When the towing vehicle then moves rearwardly the trailer will remain stationary temporarily until the sleeves 36 slide to their maximum extent along the members 37. The operator then releases the pull upon the rod 60 whereupon the springs 85 will return the parts to normal position, the rods 93 then moving outwardly and causing the latch bolts 88 to enter the notches 91. During such rearward movement the draft tongue 43 moves rearwardly until the forward end of the arcuate slot 45 engages the trunnion pin 20. The result of this is that the pivot 47 to which the steering rod 48 is connected will be to the rear instead of the front of the pin 20. This reverses the relation of the steering gear for the trailer with respect to that of the power vehicle so that when the power vehicle continues to move rearwardly and the trailer is also forced back, the trailer wheels will move in such manner as to precede the wheels of the power vehicle in true tracking relation. When it is again desired to travel forwardly the rod 60 must be pulled to retract the latch bolts 88 so that the parts may return to the position shown in Figures 1 and 2.

From the foregoing description and a study of the drawings it will be apparent that I have thus provided a very simply constructed device by means of which the backward or forward movements of a trailer may be readily controlled to insure proper tracking with respect to the power vehicle at all times. It will be noted that the latch and brake control mechanism is located entirely above the draft tongue so as to be out of the way and not interfere with the action thereof. It will also be observed that adequate provision has been made for effecting braking upon either forward or rearward movement and the device should consequently be safe and easy to handle. It is thought that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. A control mechanism for interposition between a towing vehicle and a trailer, the trailer having steering arms connected by a steering rod, comprising a supporting member mounted on the rear of the towing vehicle, a frame structure mounted on the trailer, a draft tongue pivotally connected with said supporting structure and slidable through said frame structure, the rear end of said draft tongue having a slidable and pivotal connection with said frame structure and having an operative connection with one steering arm shiftable with respect to said pivotal connection to be disposed forwardly or rearwardly thereof, and releasable means for normally preventing sliding movement of the draft tongue.

2. A control mechanism for interposition between a towing vehicle and a trailer, the trailer having steering arms connected by a steering rod, comprising a supporting member mounted on the rear of the towing vehicle, a frame structure mounted on the trailer, a draft tongue pivotally connected with said supporting structure and slidable through said frame structure, the rear end of said draft tongue having a slidable and pivotal connection with said frame structure and having an operative connection with one steering arm shiftable with respect to said pivotal connection to be disposed forwardly or rearwardly thereof, latch means for normally maintaining said draft tongue against sliding movement, and means for releasing said latch means.

3. A control mechanism for interposition between a towing vehicle and a trailer, the trailer having steering arms connected by a steering rod, comprising a supporting member mounted on the rear of the towing vehicle, a frame structure mounted on the trailer, a draft tongue pivotally connected with said supporting structure and slidable through said frame structure, the rear end of said draft tongue having a slidable and pivotal connection with said frame structure and having an operative connection with one steering arm shiftable with respect to said pivotal connection to be disposed forwardly or rearwardly thereof, means for maintaining said draft tongue normally at either limit of its slidable movement, and means for releasing said means.

4. A control mechanism for interposition between a towing vehicle and a trailer, the trailer having steering arms connected by a steering rod, comprising a supporting member mounted on the rear of the towing vehicle, a frame structure mounted on the trailer, a draft tongue pivotally connected with said supporting structure and slidable through said frame structure, the rear end of said draft tongue having a slidable and pivotal connection with said frame structure and having an operative connection with one steering arm shiftable with respect to said pivotal connection to be disposed forwardly or rearwardly thereof, latch means on said frame structure operating to maintain the draft tongue selectively at the forward or rearward limit of its movement, and means extending to the towing vehicle and manually operable to release said means.

5. A control mechanism for interposition between a towing vehicle and a trailer, the trailer having steering arms connected by a steering rod, comprising a supporting member mounted on the rear of the towing vehicle, a frame structure mounted on the trailer, a draft tongue pivotally connected with said supporting structure and slidable through said frame structure, the rear end of said draft tongue having a slidable and pivotal connection with said frame structure and having an operative connection with one steering arm shiftable with respect to said pivotal connection to be disposed forwardly or rearwardly thereof, latch means for normally maintaining the draft tongue against sliding movement, and brake means on the trailer wheels connected with said latch means and operable simultaneously therewith.

6. A control mechanism for interposition between a towing vehicle and a trailer, the trailer having steering arms connected by a steering rod, comprising a supporting member mounted at the rear of the towing vehicle, a telescopic frame structure connected therewith and mounted on the trailer, a draft tongue pivotally connected with said supporting structure and slidable through said frame structure and having a slidable and pivotal connection with the latter and further having an operative connection with one steering arm shiftable with respect to said pivotal connection to be disposed forwardly or rearwardly thereof, latch means normally preventing telescoping of the telescopic frame structure, and means for releasing said latch means.

7. A control mechanism for interposition between a towing vehicle and a trailer, the trailer having steering arms connected by a steering rod, comprising a supporting member mounted at the rear of the towing vehicle, a telescopic frame structure connected therewith and mounted on the trailer, a draft tongue pivotally connected with said supporting structure and slidable through said frame structure and having a slidable and pivotal connection with the latter and further having an operative connection with one steering arm shiftable with respect to said pivotal connection to be disposed forwardly or rearwardly thereof, brake mechanism on the trailer wheels, a latch mechanism on the frame structure normally preventing telescoping thereof, said latch mechanism being operatively connected with said brake mechanism, and means for simultaneously releasing the latch means and operating the brake mechanism.

8. A control mechanism for interposition between a towing vehicle and a trailer, the trailer having steering arms connected by a steering rod, comprising a supporting member mounted at the rear of the towing vehicle, a telescopic frame structure connected therewith and mounted on the trailer, a draft tongue pivotally connected with said supporting structure and slidable through said frame structure and having a slidable and pivotal connection with the latter and further having an operative connection with one steering arm shiftable with respect to said pivotal connection to be disposed forwardly or rearwardly thereof, latch means for maintaining said frame structure in either expanded or contracted position with said draft tongue at either the forward or rearward limit of its movement, and manual means operable by the operator of the towing vehicle for releasing said latch means.

9. A control mechanism for interposition between a towing vehicle and a trailer, the trailer having steering arms connected by a steering rod, comprising a supporting member mounted on the rear of the towing vehicle, a frame structure mounted on the trailer, a draft tongue pivotally connected with said supporting structure and slidable through said frame structure, the rear end of said draft tongue having a slidable and pivotal connection with said frame structure and having an operative connection with one steering arm shiftable with respect to said pivotal connection to be disposed forwardly or rearwardly thereof.

10. A control mechanism for interposition between a towing vehicle and a trailer, the trailer having steering arms connected by a steering rod, comprising a supporting member mounted on the rear of the towing vehicle, a frame structure depending from the trailer, a draft tongue pivotally connected with said supporting structure and slidable through said frame structure, the rear end of said draft tongue having a slidable and pivotal connection with said frame structure and pivotally connected with one steering arm, said connection comprising a slot in the rear end of the draft tongue and a pivot pin passing through and carried by said frame structure and passing through said slot whereby upon longitudinal movement of the tongue the pivotal connection with the steering arm will be shifted forwardly or rearwardly with respect to said pin.

11. A control mechanism for interposition between a towing vehicle and a trailer, the trailer having steering arms connected by a steering rod, comprising a supporting member mounted on the rear of the towing vehicle, a frame structure depending from the trailer, a draft tongue pivotally connected with said supporting structure and slidable through said frame structure, the rear end of said draft tongue having a slidable and pivotal connection with said frame structure and having an operative connection with one steering arm, the trailer axle being connected with said frame structure and having a slot to accommodate the rear end of the draft tongue when the same is moved rearwardly.

12. A control device for interposition between a towing vehicle and a trailer, comprising a supporting structure mounted on the rear of the towing vehicle and including pivotally mounted tubular members connected by a bridle bar, a frame structure secured to the bottom of the trailer and the trailer axle, members pivoted to said frame structure and telescopically engaged within said tubular members, the trailer having dirigible wheels mounted on spindles equipped with steering arms connected by a connecting rod for simultaneous movement, a draft tongue pivoted to said bridle bar, slidable within said frame structure and pivotally and slidably connected thereto, and an operative connection between said bridle bar and one steering arm.

13. A control mechanism for interposition between a towing vehicle and a trailer, comprising supporting means mounted at the rear of the towing vehicle, frame means carried by the trailer, the trailer having dirigible wheels carried by spindles equipped with steering arms connected by a connecting rod for simultaneous movement, and a draft tongue pivotally connected with said supporting means and having a pivotal and slidable connection with the frame structure and an operative connection with one steering arm shiftable forwardly or rearwardly of said pivotal and slidable connection.

In testimony whereof I affix my signature.

FRANK JACOBS.